(12) United States Patent
Baldwin et al.

(10) Patent No.: US 11,009,080 B2
(45) Date of Patent: May 18, 2021

(54) DRIVE LINK

(71) Applicant: Bell Helicopter Textron Inc., Fort Worth, TX (US)

(72) Inventors: Tyler Wayne Baldwin, Keller, TX (US); Ryan T. Ehinger, Southlake, TX (US); Jared Mark Paulson, Fort Worth, TX (US); Michael Christopher Burnett, Fort Worth, TX (US); Kyle Thomas Cravener, Watauga, TX (US)

(73) Assignee: Textron Innovations Inc., Providence, RI (US)

( * ) Notice: Subject to any disclaimer, the term of this patent is extended or adjusted under 35 U.S.C. 154(b) by 312 days.

(21) Appl. No.: 15/916,134

(22) Filed: Mar. 8, 2018

(65) Prior Publication Data
US 2019/0277343 A1    Sep. 12, 2019

(51) Int. Cl.
*F16D 3/62* (2006.01)
*F16C 7/04* (2006.01)
*B64C 11/02* (2006.01)
*B64C 29/00* (2006.01)

(52) U.S. Cl.
CPC ............. *F16D 3/62* (2013.01); *B64C 11/02* (2013.01); *F16C 7/04* (2013.01); *B64C 29/0033* (2013.01)

(58) Field of Classification Search
CPC .......... F16D 3/62; F16C 7/04; F16C 2208/04; F16C 2326/43; F16C 7/026; B64C 11/02; B64C 29/0033
USPC ........................................ 464/69, 85; 59/84
See application file for complete search history.

(56) References Cited

U.S. PATENT DOCUMENTS

| 1,676,333 | A | * | 7/1928 | Kattwinkel | ............... F16D 3/62 464/69 |
| 4,019,345 | A | * | 4/1977 | Fukuda | ..................... F16D 3/62 464/69 |
| 4,804,352 | A | * | 2/1989 | Schmidt | .................. B64C 27/41 464/69 |

\* cited by examiner

*Primary Examiner* — Greg Binda
(74) *Attorney, Agent, or Firm* — Lightfoot & Alford PLLC

(57) ABSTRACT

A link includes an outer composite portion substantially encircling at least two bearing pockets and a central substantially incompressible portion disposed between the at least two bearing pockets.

20 Claims, 7 Drawing Sheets

US 11,009,080 B2

DRIVE LINK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft such as tiltrotors commonly comprise drive links as torque transferring devices in rotor hubs. Conventional drive links are constructed of a solid metal housing, two solid metal inner housings, and two elastomeric packages connecting the housings. The solid metal drive links are undesirably heavy and expensive to manufacture.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
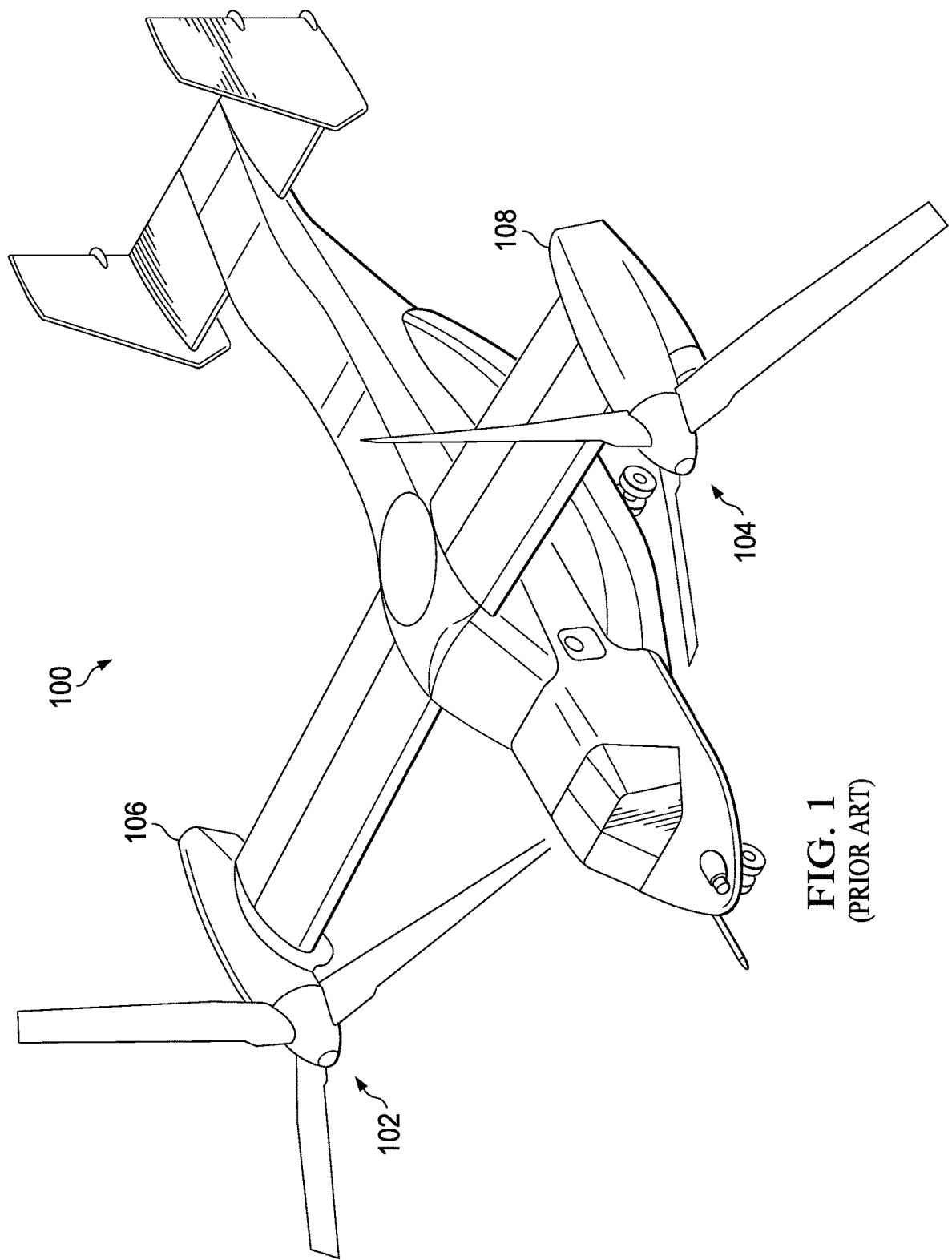
FIG. 1 is an oblique view of a prior-art tiltrotor aircraft.

Designs of rotors and propellers for aircraft are often extremely complex. A large number of factors must be taken into account, including flexure of the rotor under heavy loads and the required motions of the rotor blades with respect to the drive mechanism. The considerations for proprotors, used as both propellers and rotors in aircraft such as a tiltrotor aircraft, can be more complex than usual. A tiltrotor aircraft 100 having three-blade proprotors 102, 104 driven by engines carried in nacelles 106, 108, respectively, is shown in FIG. 1. In alternative embodiments, an aircraft comprising one or more engines disposed in portions of the aircraft other than nacelles can be utilized. In a gimbaled rotor, joints must be provided between the driveshaft that carries torque from the engine and the yoke that drives the blades, giving rise to a relatively complex hub assembly. An example of such an assembly used in proprotors is described generally in U.S. Pat. No. 4,804,352, assigned to Lord Corporation, which is incorporated by reference herein as if set forth in full and shown in FIGS. 2-5.

Figure 2:
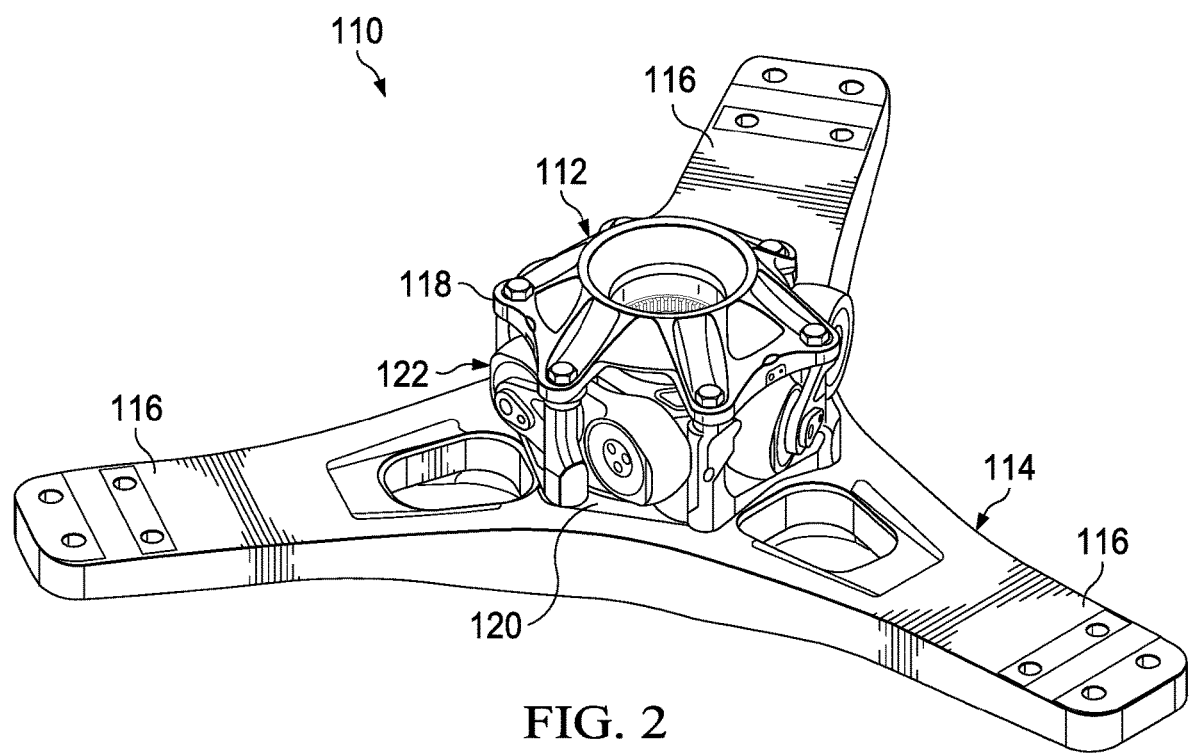
FIG. 2 is an enlarged oblique view of a portion of a rotor assembly of the tiltrotor aircraft of FIG. 1.

FIG. 2 shows a rotor assembly 110, comprising hub assembly 112 and yoke 114. Yoke 114 has three arms 116 that extend radially and are configured for rotor blades (visible in FIG. 1) to be attached thereto. Hub assembly 112 comprises an upper hub-spring plate 118, lower hub-spring plate 120, and a constant-velocity (CV) joint 122 carried between hub-spring plates 118, 120.

Figure 3:
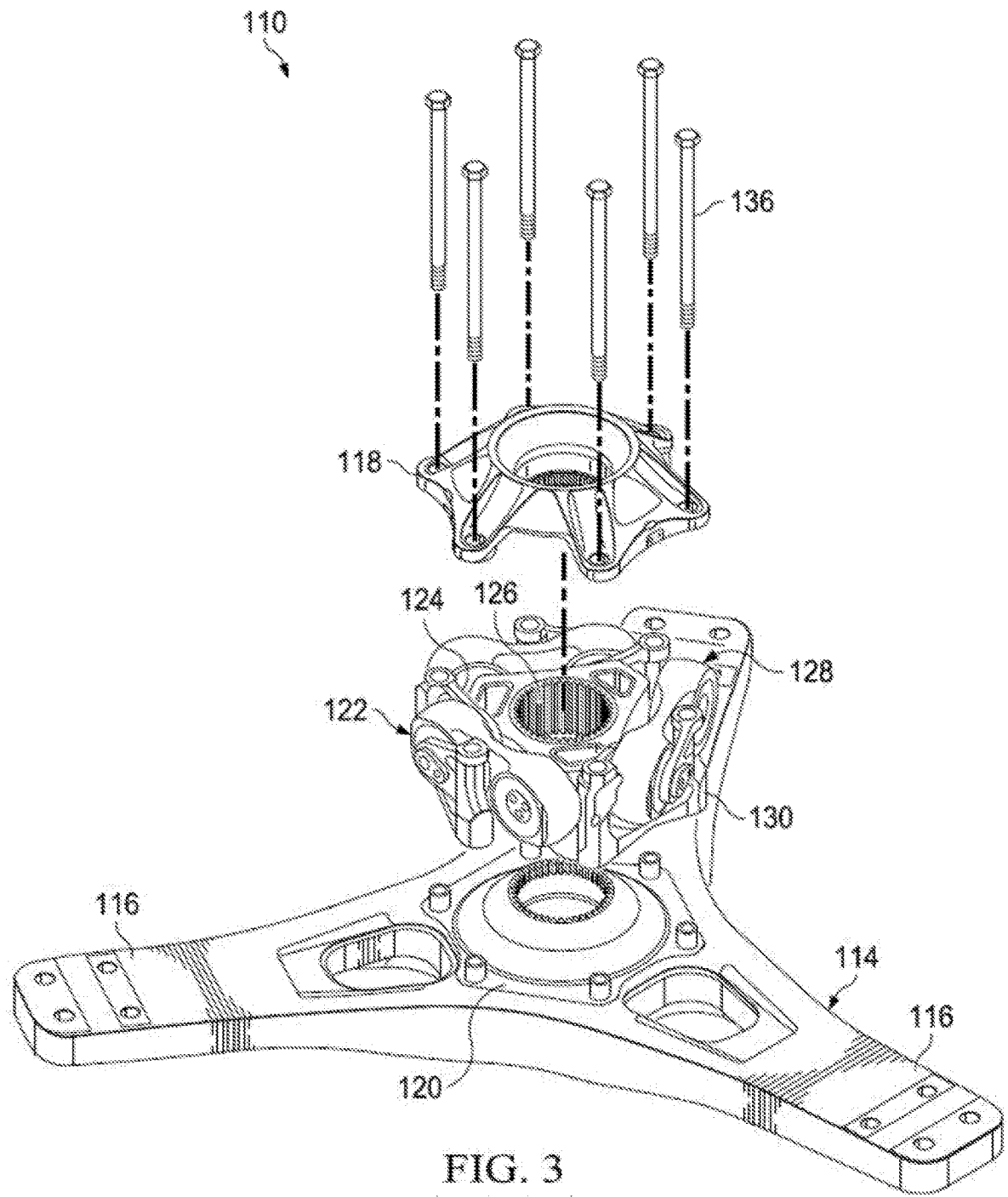
FIG. 3 is an exploded oblique view of the portion of a rotor assembly of FIG. 2.
Figure 4:
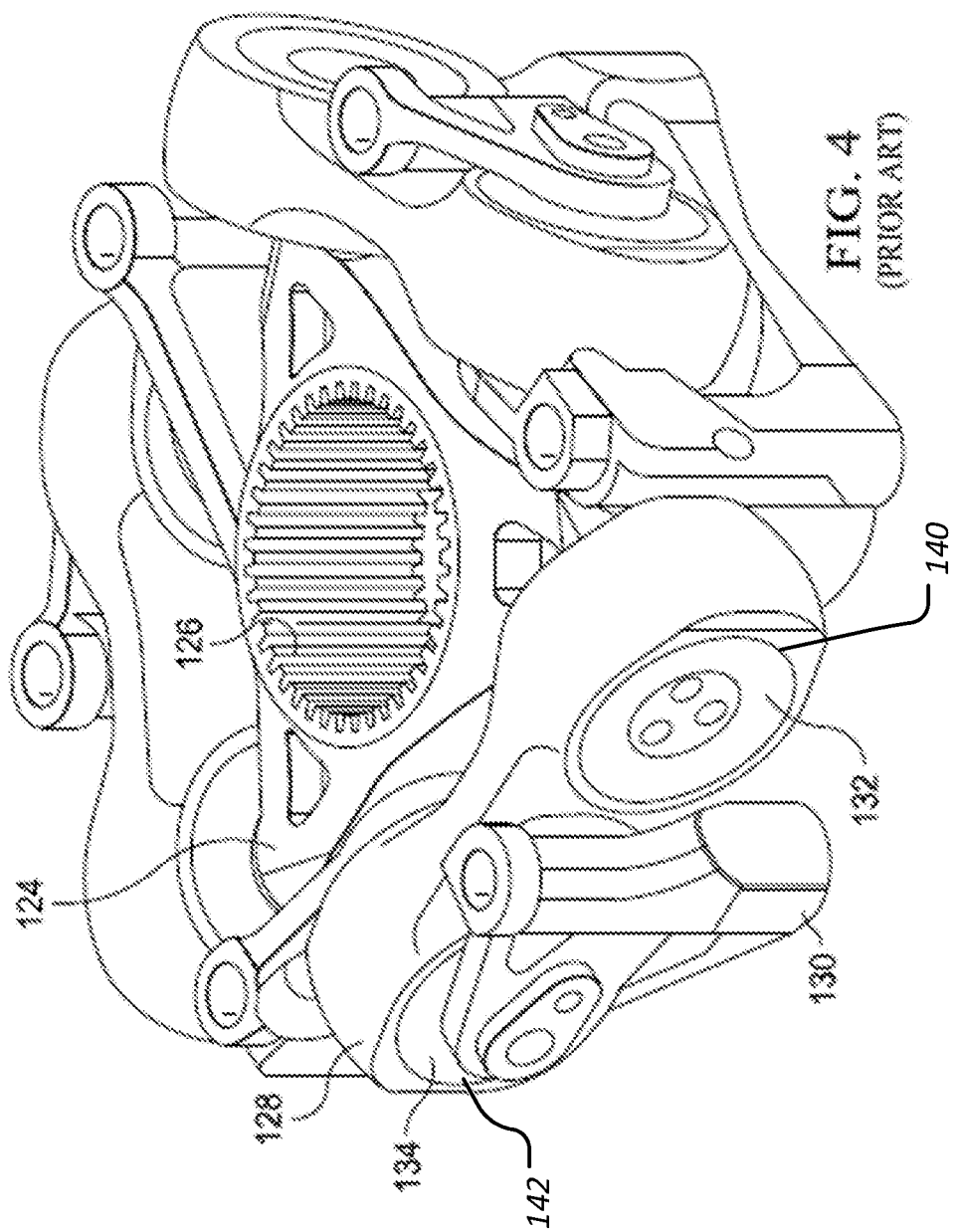
FIG. 4 is an oblique view of the portion of a rotor assembly of FIG. 2 with some of the components being removed for ease of viewing.
Figure 5:
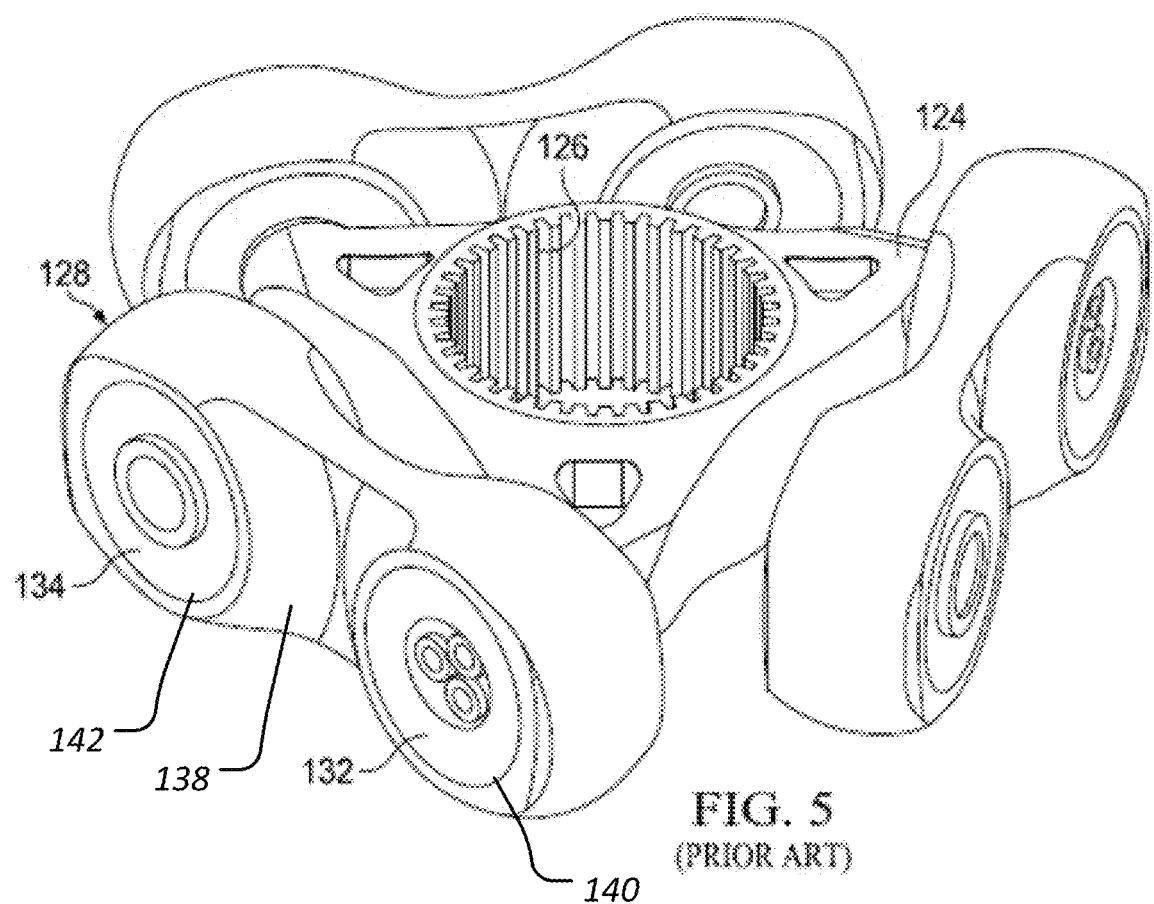
FIG. 5 is an oblique view of the portion of a rotor assembly of FIG. 2 with some of the components being removed for ease of viewing.

Referring now to FIGS. 3-5, a drive hub 124 has a splined opening 126 for receiving a splined driveshaft (not shown), and drive hub 124 is connected through pivoting linkage to yoke 114. The pivoting linkage comprises three pairs of members, each pair having a link 128 and pillow block 130. Use of these links 128 is described in detail in U.S. Pat. No. 5,186,686, assigned to Lord Corporation, which is incorporated by reference herein as if set forth in full. Each end of links 128 has a spherical laminated elastomeric bearing 132, 134, with the leading-end bearing 132 of each link 128 being connected to a trunnion of hub 124 and the trailing-end bearing 134 of each link 128 being connected to a pillow block 130. Pillow blocks 130 are connected to hub-spring plates 118, 120 with bolts 136, and bolts 136 also fasten hub-spring plates 118, 120 to each other and to yoke 114. This provides a path for torque to be transferred from the driveshaft into drive hub 124, through drive hub 124 into links 128, through links 128 into pillow blocks 130, through pillow blocks 130 into bolts 136 and hub-spring plates 118, 120, and through bolts 136 and hub-spring plates 118, 120 into yoke 114 for driving the blades. Hub-spring plates 118, 120 cooperate to carry the thrust and shear loads for the rotor.

Referring specifically to FIG. 5, the prior-art link 128 has a unitary metal body 138 that comprises two bearing pockets 140, 142 on opposite ends of body 138. A leading bearing pocket 140 houses leading bearing 132 and a trailing bearing pocket 142 houses trailing bearing 134. Trailing bearing pocket 142 is longitudinally spaced from leading bearing pocket 140. Between pockets 140, 142 is a thick web that connects pockets 140, 142 and provides link 128 with high stiffness in the longitudinal direction, which is the direction of force as leading bearing 132 is driven by drive hub 124. While such metal construction has remained the conventional solution for providing such a link in helicopter hub assemblies, the metal link 128 is expensive to manufacture and is undesirably heavy.

Figure 6:
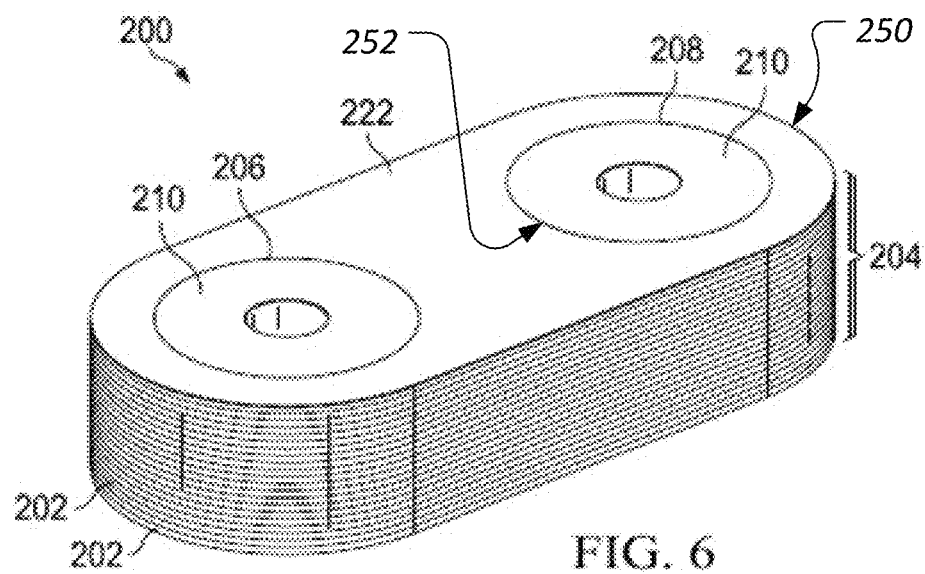
FIG. 6 is a top view of an improved constant velocity joint drive link configured for use in a rotor assembly like that shown in FIG. 2.

Referring now to FIG. 6, a drive link 200 according to an embodiment of this disclosure is shown. The drive link 200 comprises a composite block of material, namely, a stack of composite material manufactured with the Broadgoods methodology. The drive link 200 is shown as comprising discrete layers 202 of composite material cured together to form the unitary block of material having a substantially constant thickness 204. Each of the layers 202 can, prior to curing and/or adhering, initially comprise dry or prepreg fiberglass or carbon-fiber sheets. The layers 202 can be provided as any suitable combination of broadgoods material type and can be provided with any suitable directional fiber orientation. In some embodiments, the distribution of directionality of the unidirectional broadgoods layers 202 may comprise in total about two-thirds 0 degree oriented layers 202, about 5% to about 10% 90 degree oriented layers 202, and a remainder of broadgoods layers 202 with a combination of +/−45 degree oriented layers 202. The orientation of the directionality of layers 202 can be selected to ensure a desired strength when the drive link 200 is in tension (most of the time) while also ensuring enough strength in compression (during transient or irregular exposures to compression or negative torque).

Drive link 200 further comprises bearing pockets 206, 208. In this embodiment, the bearing pockets 206, 208 are formed as through holes extending through the entire thickness 204 of the drive link 200. The above-described spherical laminated elastomeric bearings or any other suitable bearing configured to allow a cocking motion relative to a central axis of the bearing pockets 206, 208 can be disposed within the bearing pockets 206, 208. The bearing pockets 206, 208 are well suited to receive an outer metal ring of a bearing and the outer metal ring can be secured relative to the bearing pockets 206, 208 by secondary bonding the outer metal ring to the inner walls of the bearing pockets 206, 208 or by fixing the bearing into place by vulcanizing a Bismaleimide (BMI) resin between the bearing and the bearing pockets 206, 208. The bearings are shown in a very simplified form in FIG. 6 as bearings 210. As compared to titanium drive links, the drive link 200 offers a potential 60% or more weight savings when the drive link 200 is primarily constructed of fiberglass.

At least one of the outer portion and the central portion comprises a profile that is shaped as at least a portion of a wall of a cylinder. More specifically, the outer portion comprises an outer profile 250 that is shaped as at least a portion of a wall of a cylinder. Further, the central portion comprises a central profile 252 that is shaped as at least a portion of a wall of a cylinder.

Figure 7:
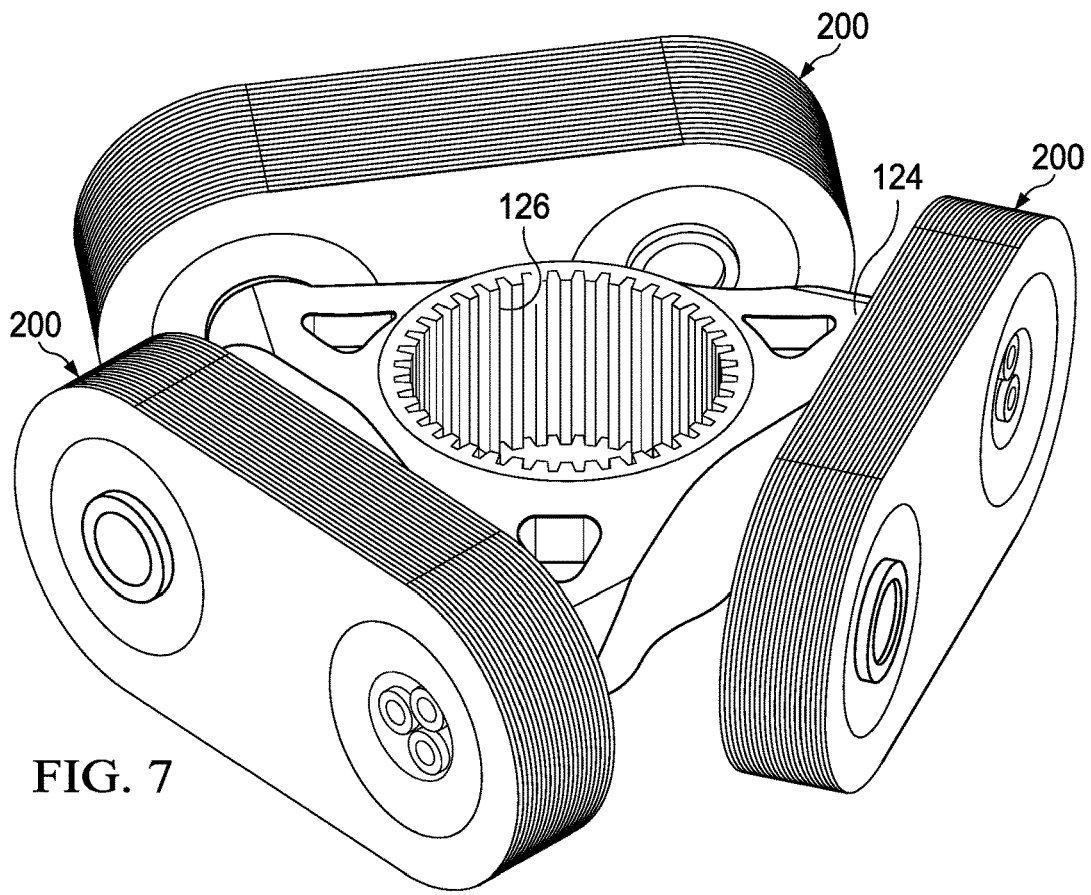
FIG. 7 is an oblique view of three drive links of FIG. 6 installed on a portion of a rotor assembly like that shown in FIG. 5.

Referring to FIG. 7, drive links 200 are shown installed on a hub 124 in substantially the same manner links 128 are shown connected to a hub 124 in FIG. 5. Although the drive links 200 may comprise a boxier outer profile as compared to the tailored metal drive links 128, the drive links 200 nonetheless provide sufficient strength in both tension and compression while also providing the above-described reduction in weight.

Figure 8:
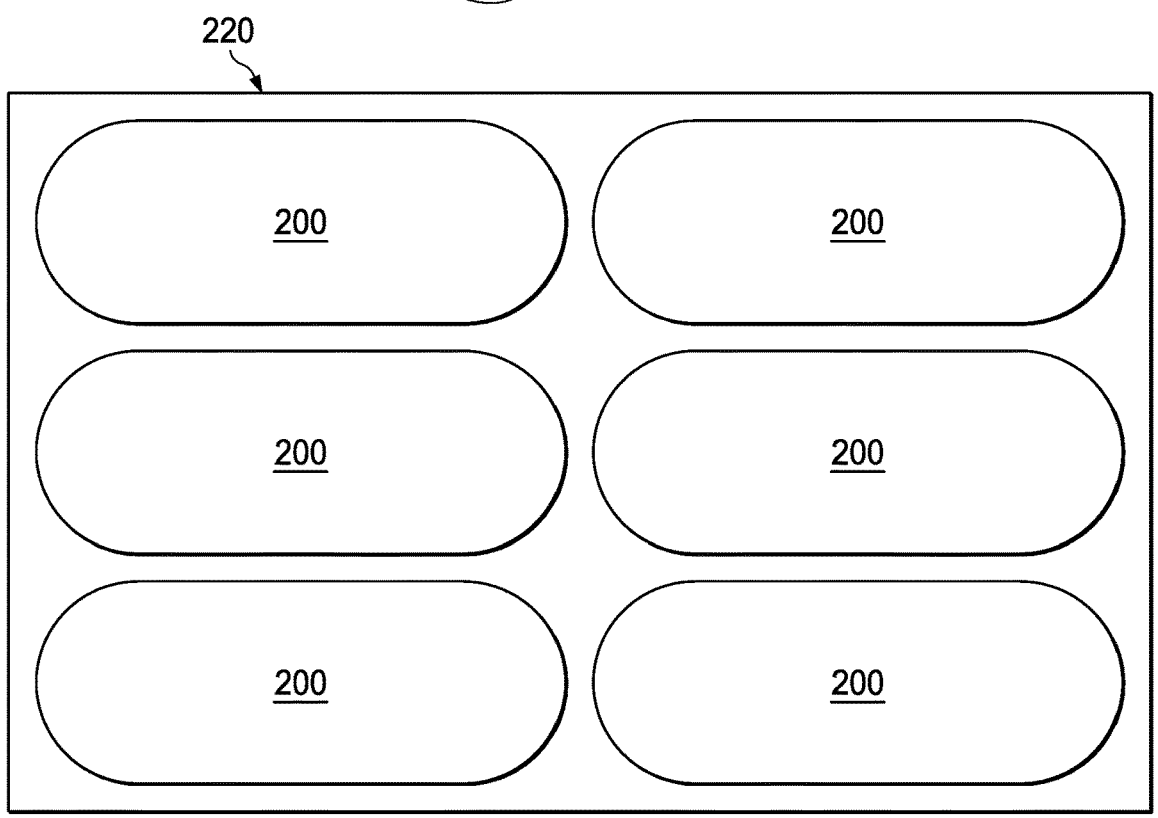
FIG. 8 shows a broadgoods stack layup with multiple drive links still integrated within the layup.

Referring to FIG. 8, a top view of an example of a broadgoods layup 220 is shown. Another advantage of the drive links 200 over the drive links 128 is that the drive links 200 are much more cost efficient to manufacture. In some cases, the drive links 200 can be produced by first stacking and orienting uncut layers 202 in a desired layout. With the layers 202 in place, the layers 202 can be cured or otherwise adhered to each other to form the unitary block described above. After the stack of uncut layers 202 has formed the unitary block, multiple drive links 200 can be cut from the single block of material. In some cases, the bearing pockets 206, 208 may be drilled or otherwise formed in the block of material prior to cutting the drive link 200 from the broadgoods layup 220. In other cases, the drive links 200 can be first cut from the broadgoods layup 220 and the bearing pockets 206, 208 can be drilled out or otherwise formed in each of the drive links 200.

Figure 9:
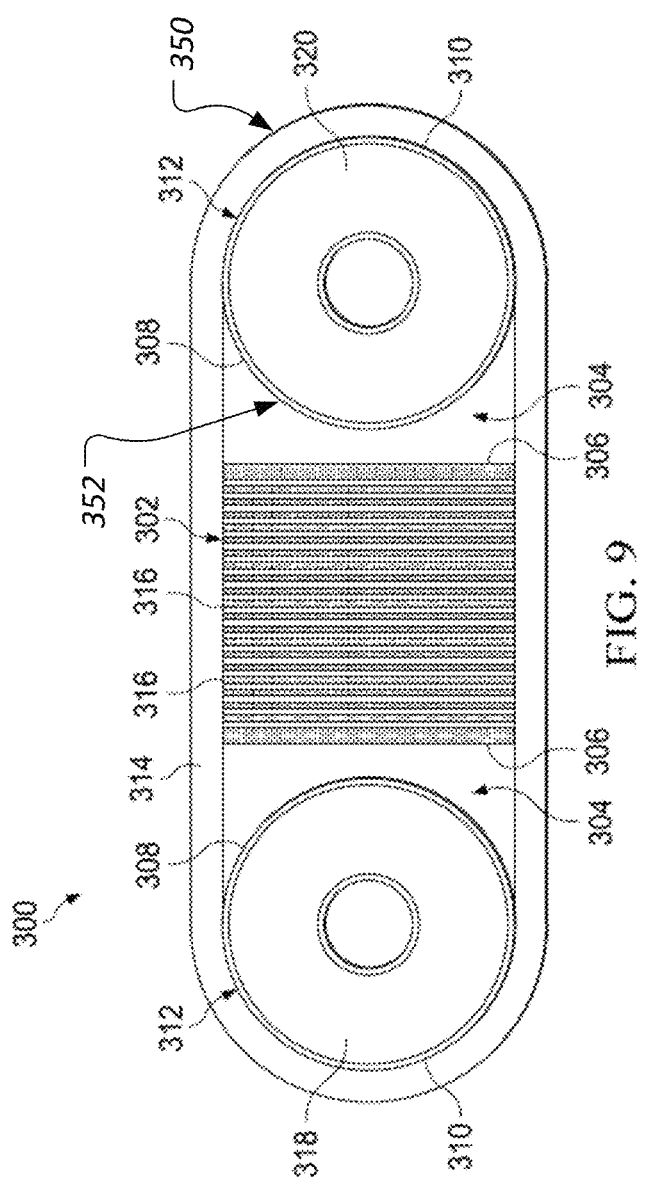
FIG. 9 is a top view of another improved constant velocity joint drive link configured for use in a rotor assembly like that shown in FIG. 2.

Referring to FIG. 9, an improved drive link 300 is shown. The drive link 300 generally comprises a central composite block 302 disposed between two outwardly facing chocks 304. The chocks 304 each comprise a substantially flat inner profile 306 and a substantially round outer profile 308. The flat inner profiles 306 abut the composite block 302 and the round outer profiles 308 are sized and shaped complementary to an outer ring 310 of bearings 312. The drive link 300 also comprises a composite wrap 314 that encircles outer portions or sidewalls of each of the composite block 302, the chocks 304, and the outer rings 310 so that the assembly is banded together as a unitary object by the composite wrap 314. Much like the broadgoods layers 202, the layers 316 of the central composite block 302 can comprise any suitable combination of types of composite material, in any suitable distribution, and in any suitable orientation. The chocks 304 can comprise metal, such as, but not limited to, aluminum or titanium. Alternatively, the chocks 304 can comprise a compression molded material, such as, but not limited to, a compression molded fiberglass material. In yet other embodiments, the chocks 304 and the central composite block 302 can be replaced by a unitary metallic component. The composite wrap 314 or roving can comprise any suitable composite material that is generally supplied in long uninterrupted lengths, such as on a spool. In some embodiments the composite wrap 314 can comprise fiberglass material while in other embodiments the composite wrap 314 can comprise carbon fiber material. In use, the composite wrap 314 takes the tensile load and the central composite block 302 takes the compression loads. In this embodiment, the central composite block 302 comprises layers 316 that are stacked flat and plate-like between the flat inner profiles 306.

At least one of the outer portion and the central portion comprises a profile that is shaped as at least a portion of a wall of a cylinder. More specifically, the outer portion comprises an outer profile 350 that is shaped as at least a portion of a wall of a cylinder. Further, the central portion comprises a central profile 352 that is shaped as at least a portion of a wall of a cylinder.

Figure 10:
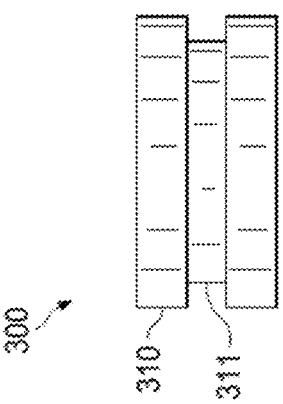
FIG. 10 is a side view of an outer ring of a bearing of the drive link of FIG. 9.

Referring now to FIG. 10, a side view of an outer ring 310 is shown. The outer ring 310 comprises an at least partially circumferential channel 311 that is configured to receive a portion of the composite wrap 314 so that the bearing 312 is better maintained in a desired position as the composite wrap 314 is applied. In some embodiments, channels 311 can be provided only on portions of the outer ring 310 that contact the composite wrap 314. In some embodiments, multiple channels 311 can be provided to a same outer ring 310.

Referring back to FIG. 9, in alternative embodiments, the composite block 302 may comprise a compression molded material, such as, but not limited to, compression molded fiberglass. Also similar to the drive link 200, the drive link 300 can offer about a 60% or more reduction in weight as compared to the links 128. While not shown, drive links 300 can be assembled to a hub 124 in substantially the same manner drive links 200 are assembled to a hub 124 as shown in FIG. 7. While not formed by removal of material, drive link 300 nonetheless comprises pockets 318, 320 in which bearings 312 are disposed. In some embodiments, the composite wrap can comprise a composite wrap glass or carbon tape that can be applied by existing fiber placement rigs.

It will be appreciated that although drive link 200 and drive link 300 comprise different components and are assembled by different methods, both drive link 200 and drive link 300 share the features of comprising pockets disposed within an outer composite material. With regard to the drive link 200, the outer composite material comprises at least the outermost portions of the broadgoods body 222. With regard to the drive link 300, the outer composite material comprises at least the composite wrap 314. The drive link 200 and the drive link 300 are further similar insofar as they both comprise substantially incompressible central composite portions disposed between the bearing pockets. With regard to the drive link 200, the incompressible central composite portion simply comprises the composite material of the layers 202 between the bearing pockets 206, 208. With regard to the drive link 300, the incompressible central composite portion comprises at least the central composite block 302. Link 300 differs from prior-art link 128 in several ways, including construction materials. As described above, link 128 is formed of metal, whereas link 300 is able to be formed, at least in part, from composite materials such as fiberglass composites or carbon-fiber composites.

Regardless of the specific construction of links 200, 300, links 200, 300 must be strong enough to withstand transient negative torque. These transient negative torques may be approximately ⅙ to ¼ of the positive torque load. While composites excel when used in tension, such as experienced with positive torque, negative torque leads to compression of links 200, 300. Therefore, links 200, 300 must be engineered to handle both the positive and negative torque loads. Also, while the drive links 200, 300 are primarily described above as being utilized as drive links, in some cases, the drive links 200, 300 may be utilized as idler links.

It will further be appreciated that while bearings 210, 312 are described above as comprising spherical laminated elastomeric bearings, alternative embodiments of drive links can comprise any other suitable type of bearing or bearing package, such as, but not limited to, journal bearings, roller bearings, ball bearings, and/or any other type of bearing, with or without associated elastomeric components.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A link, comprising:
    an outer composite portion comprising a plurality of layers substantially encircling at least two bearing pockets, wherein the plurality of layers are fixed relative to each other; and
    a central substantially incompressible portion disposed between the at least two bearing pockets, wherein the central portion comprises a plurality of composite layers and the plurality of composite layers of the central portion are fixed relative to each other;
    wherein at least one of the outer portion and the central portion comprises a profile that is shaped as at least a portion of a wall of a cylinder.

2. The link of claim 1, wherein the outer composite portion comprises a stack of broadgoods layers.

3. The link of claim 1, wherein the central substantially incompressible portion comprises a stack of broadgoods layers.

4. The link of claim 3, wherein the outer composite portion comprises the stack of broadgoods layers.

5. The link of claim 1, wherein the outer composite portion comprises a wrapped composite material.

6. The link of claim 1, wherein each of the at least two bearing pockets are configured to receive a bearing.

7. The link of claim 6, further comprising:
    a chock disposed between at least one of the at least two bearing pockets and the central substantially incompressible portion.

8. The link of claim 7, wherein the chock comprises a substantially flat inner profile configured to face the central substantially incompressible portion.

9. The link of claim 7, wherein the chock comprises a substantially round outer profile configured to face at least one of the two bearing pockets.

10. The link of claim 7, wherein the central substantially incompressible portion comprises a stack of broadgoods layers.

11. The link of claim 7, wherein the chock comprises a compression molded material.

12. The link of claim 7, wherein the central substantially incompressible portion comprises a compression molded material.

13. The link of claim 7, further comprising a bearing disposed in one of the at least two bearing pockets and wherein the outer composite portion is at least partially received within an at least partially circumferential channel of an outer ring of a bearing.

14. The link of claim 6, further comprising:
    a metallic chock disposed between the at least two bearing pockets, the metallic chock comprising a first round outer profile configured to face a first one of the at least two bearing pockets and a second round outer profile configured to face a second one of the at least two bearing pockets.

15. A rotorcraft, comprising:
a hub assembly, comprising:
  a link, comprising:
    an outer composite portion comprising a plurality of layers substantially encircling at least two bearing pockets, wherein the plurality of layers are fixed relative to each other; and
    a central substantially incompressible portion disposed between the at least two bearing pockets, wherein when the central portion comprises a plurality of composite layers and the plurality of composite layers of the central portion are fixed relative to each other;
  wherein at least one of the outer portion and the central portion comprises a profile that is shaped as at least a portion of a wall of a cylinder.

16. The rotorcraft of claim 15, wherein the outer composite portion comprises a stack of broadgoods layers.

17. The rotorcraft of claim 15, wherein the central substantially incompressible portion comprises a stack of broadgoods layers.

18. The rotorcraft of claim 17, wherein the outer composite portion comprises the stack of broadgoods layers.

19. The rotorcraft of claim 15, wherein the outer composite portion comprises a wrapped composite material.

20. The rotorcraft of claim 15, wherein each of the at least two bearing pockets are configured to receive a bearing.

* * * * *